United States Patent
Velasco et al.

(10) Patent No.: US 8,302,596 B1
(45) Date of Patent: Nov. 6, 2012

(54) ROBUST GLASS TO METAL SEALING JOINT

(75) Inventors: David Velasco, Mount Laurel, NJ (US); John Ditri, Huntingdon Valley, PA (US); Nancy E. Wasson, Mount Laurel, NJ (US); David S. Munsky, New York, NY (US); Mark Trent, Cambridge (CA)

(73) Assignee: Lockheed Martin Corporation, Bethesda, MD (US)

( * ) Notice: Subject to any disclaimer, the term of this patent is extended or adjusted under 35 U.S.C. 154(b) by 351 days.

(21) Appl. No.: 12/604,055

(22) Filed: Oct. 22, 2009

(51) Int. Cl.
*F24J 2/46* (2006.01)
*C03C 3/118* (2006.01)
*C03C 3/091* (2006.01)
*C03C 3/085* (2006.01)

(52) U.S. Cl. .......... 126/712; 126/704; 126/713; 501/59; 501/66; 501/69

(58) Field of Classification Search .......... 501/57, 501/58, 59, 66, 68, 69, 72; 126/569, 704, 126/712; 313/495
See application file for complete search history.

(56) References Cited

U.S. PATENT DOCUMENTS

| | | | |
|---|---|---|---|
| 1,294,466 A | 2/1919 | Houskeeper | |
| 1,716,140 A | 6/1929 | Kirwer | |
| 2,010,145 A | 8/1935 | Eitel | |
| 2,057,452 A | 10/1936 | Scott | |
| 2,457,144 A | 12/1948 | Goodale | |
| 2,504,521 A | 4/1950 | Greiner | |
| 3,203,715 A | 8/1965 | Benbenek | |
| 3,370,874 A | 2/1968 | Scherer et al. | |
| 3,388,274 A | 6/1968 | Kawiecki | |
| 4,185,365 A * | 1/1980 | Hueschen et al. | 445/28 |
| 4,386,164 A | 5/1983 | Moser | |
| 4,888,037 A * | 12/1989 | Bandyopadhyay et al. | 65/32.2 |
| 5,176,732 A * | 1/1993 | Block et al. | 65/21.4 |
| 6,324,870 B1 | 12/2001 | Chabin et al. | |
| 2005/0181925 A1* | 8/2005 | Kuckelkorn et al. | 501/66 |

* cited by examiner

*Primary Examiner* — Noah Wiese
(74) *Attorney, Agent, or Firm* — Richard E. Billion; Clise, Billion & Cyr, P.A.

(57) ABSTRACT

A matched glass-to-metal connecting device for use in a vacuum tube collector for a solar energy collecting apparatus is made of a glass envelope and a metal sleeve directly bonded to the glass envelope. The glass envelope is made of a glass having a composition, in percent by weight on the basis of oxide content, consisting essentially of $B_2O_3$, 19; $Al_2O_3$, 8; $Na_2O$, 2; $K_2O_2$, 3; BaO, 3; LiF, 1; and balance of $SiO_2$ and the metal sleeve consists of metal material number 1.3981 of DIN 17745. The glass envelope has a thermal expansion coefficient that deviates from the metal part's thermal expansion coefficient by no more than 4% in the temperature range from 25° C. to 350° C.

5 Claims, 2 Drawing Sheets

ROBUST GLASS TO METAL SEALING JOINT

CROSS-REFERENCE TO RELATED APPLICATION

None

FIELD OF THE INVENTION

This disclosure relates to a glass-to-metal seal used in solar energy vacuum tube collectors.

BACKGROUND

In the solar energy vacuum tube collectors, a vacuum seal must be present between the glass envelope tube and the metal absorber tube. The area between the glass envelope tube and the metal absorber tube must be evacuated to ensure thermal isolation. The purpose of the glass-to-metal joint is to provide a hermetic seal between the glass envelope tube and the metal absorber tube to maintain the necessary vacuum.

Because solar collectors operating in the field experience daily temperature fluctuations with temperatures reaching 400° C. The temperature fluctuations compounded by the mismatch in the thermal expansion coefficients of typical glass envelope tubes and the metal at the glass-to-metal seal result in cyclical thermal stresses in the glass envelope, particularly at the glass-to-metal joint and pose reliability problems.

In some glass-to-metal joints currently used in high temperature solar collectors, a housekeeper seal design is used. In the housekeeper seal, a very thin metal tongue with a comparatively high thermal expansion coefficient of about $5 \times 10^{-6}$ $K^{-1}$ in the temperature range of 25° C. to 350° C. is fused with a temperature-change-resistant glass with a considerably lower thermal expansion coefficient of about $3 \times 10^{-6} K^{-1}$. The thermal stresses under thermal loads are then absorbed by plastic deformation of the metal tongue. The cyclical thermal stresses, however, frequently lead to undesirably high mechanical breakdown rates of the glass-metal joint of more than 4% per annum. This is a barrier to widespread introduction of solar technology in the power-engineering field.

In some conventional systems, one or more intermediary glasses are used to form the glass-to-metal joints. This solution is costly because it increases the engineering work, the disposal rate and manufacturing costs.

In other conventional solar energy vacuum tube collectors, also known as heat collector element (HCE), an absorber tube, generally a metal pipe, is provided within a glass envelope cylinder/tube. The absorber tube extends the entire length of the glass envelope and the ends of the absorber tube and the glass envelope are hermetically sealed together by a sealing assembly and the space between the glass envelope and the absorber tube is maintained in a vacuum. The sealing assembly generally comprises a tubular metal sleeve that is joined to the glass envelope on one end and joined to a flexible bellows structure on the other end. The flexible bellows structure is in turn joined to the absorber tube extending out from the glass envelope. One of the structural reliability concerns with this structure arises from the mismatch in the thermal coefficient of expansion (TCE) between the glass envelope and the metal sleeve at the glass-to-metal joint formed between the glass envelope and the metal sleeve. The mismatch in the TCE between the two materials forming the glass-to-metal joint generates cyclical stresses during the operation of the solar collectors and may result in failure of the glass-to-metal joint.

There has been attempts to match the TCEs of the glass envelope and the metal sleeve to improve the reliability of the glass-to-metal joint. However, there is a need for more improvement.

Thus, there is a need for improved material set that can form a more robust glass-to-metal seal.

SUMMARY

According to an embodiment of the present disclosure, a matched glass-to-metal connecting device for use in a vacuum tube collector for a solar energy collecting apparatus is disclosed. The matched glass-to-metal connecting device is comprised of a glass tube and a metal tube directly bonded to the glass tube. The glass tube consists of a glass having a composition, in percent by weight on the basis of oxide content, consisting essentially of:

| | |
|---|---|
| $B_2O_3$ | 19, |
| $Al_2O_3$ | 8, |
| $Na_2O$ | 2, |
| $K_2O_2$ | 3, |
| BaO | 3, |
| LiF | 1, and |
| $SiO_2$ | balance to 100% |

The metal tube consists of metal material number 1.3981 of DIN 17745 having a thermal expansion coefficient of $4.89 \times 10^{-6} K^{-1}$ in the temperature range of 25° C. to 350° C. and the glass tube has a thermal expansion coefficient that deviates from the metal part's thermal expansion coefficient by no more than 4% in the temperature range of 25° C. to 350° C.

According to another embodiment, a method of making a matched glass-metal connecting device is also disclosed. The method includes the steps of providing a glass tube consisting of a glass having a composition, in percent by weight on the basis of oxide content, consisting essentially of:

| | |
|---|---|
| $B_2O_3$ | 19, |
| $Al_2O_3$ | 8, |
| $Na_2O$ | 2, |
| $K_2O_2$ | 3, |
| BaO | 3, |
| LiF | 1, and |
| $SiO_2$ | balance to 100% | then bonding an end portion of the glass tube directly with a metal tube where the metal tube consists of metal material number 1.3981 of DIN 17745 having a thermal expansion coefficient of $4.89 \times 10^{-6} K^{-1}$ in the temperature range of 25° C. to 350° C. and the thermal expansion coefficient of the glass tube deviates from the metal part's thermal expansion coefficient by no more than 4% in the temperature range of 25° C. to 350° C.

The glass composition disclosed herein provides for an improved matching glass-to-metal joint or connecting device where the thermal expansion coefficient of the glass is matched closely with the thermal expansion coefficient of the metal part, which improves the temperature cycling reliability of such glass-to-metal joints that are well suited for used in a vacuum tube collector of a solar energy collecting apparatus or in an X-ray tube. Use of the glass composition disclosed herein also improves and streamlines the manufacturing of such vacuum tube collectors because the conventional use of an intermediary glass materials of varying thermal expansion coefficients can be eliminated.

The glass-to-metal sealing solution provided by the present disclosure provides a solar collector with only one type of glass that forms the glass-to-metal joint as well as the glass envelope tube itself, with a thermal expansion close to that of the metal sleeve, eliminating the need for multiple grades of glass. The use of a housekeeper seal in solar receiver applications is a high risk component, and this solution eliminates the thin feathered edged metal tongue required for the housekeeper seal, with a more robust glass-to-metal joint. By implementing the use of only one glass composition there are vast improvements in manufacturability of solar receivers, reducing both the overall material cost and the manufacturing time. There is also a potential improvement in receiver efficiency, by exposing more of the absorber tube to the available solar energy from the reduction in seals and the prospective of eliminating the radiation shield.

BRIEF DESCRIPTION OF THE DRAWINGS

These and other features and advantages of the present disclosure will be more fully disclosed in the following detailed description of a preferred embodiment of the invention, which is to be considered together with the accompanying drawings.

Figure 1:
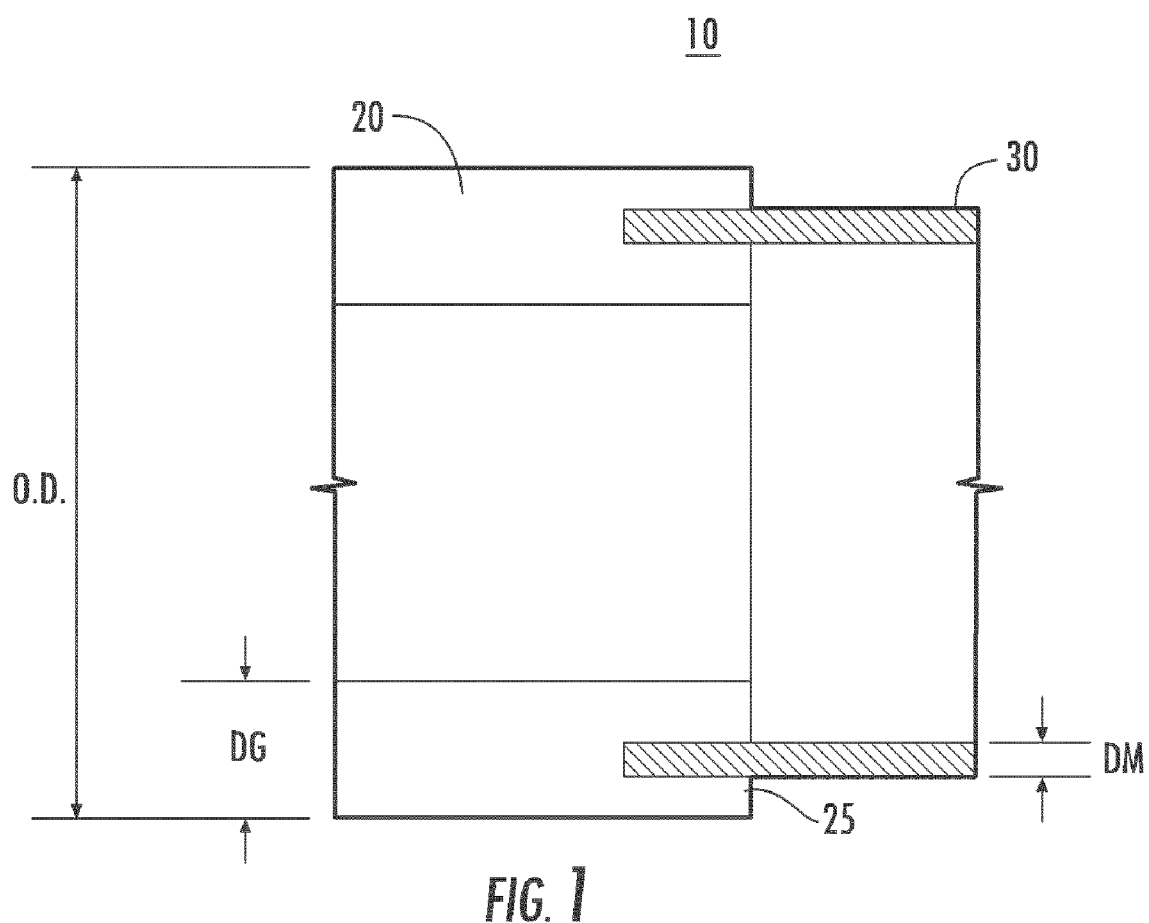
FIG. 1 shows a cross-sectional view of an example of a glass-to-metal sealing joint between a glass envelope cylinder/tube part and a cylindrical/tubular metal sleeve part according to an embodiment of the present disclosure.

The features shown in the above referenced drawings are illustrated schematically and are not intended to be drawn to scale nor are they intended to be shown in precise positional relationship.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "bonded," "bonding," "joined," "joining," "attached," "attaching," "mounted," and "mounting" are used interchangeably and refer to one structure or surface being secured or connected to another structure or surface, unless expressly described otherwise.

Referring to FIG. 1, a glass-to-metal sealing joint 10 according to an embodiment of the present disclosure is disclosed. The glass-to-metal sealing joint 10 is comprised of a glass envelope cylinder/tube 20 that is directly joined to a cylindrical/tubular metal sleeve structure 30.

In one preferred embodiment, the metal sleeve structure 30 is made of metal material number 1.3981 of DIN 17745, a nickel-iron-cobalt ferrous alloy, that has a composition, in weight percent, consisting of:

| Ni | 28-30% |
|----|--------|
| C  | up to 0.05% |
| Co | 16-18% |
| Fe | balance to 100% |

The term "balance to 100%" means that the entire remaining portion of the composition consists of that corresponding component. However, the composition does not exclude the presence of any impurities. The metal material has a thermal expansion coefficient of $4.89 \times 10^{-6}$ $K^{-1}$ in the temperature range between 25° C. to 350° C. In a preferred embodiment, the metal sleeve structure 30 generally has a wall thickness Dm between 0.5 mm and 1.5 mm in the region that is joined to the glass envelope 20. The glass envelope 20 has a wall thickness of Dg of about 3 mm and an appropriate outer diameter O.D. to provide sufficient internal space for an absorber tube.

The glass envelope structure 20 consists of a borosilicate glass having a composition, in percent by weight of the basis of oxide content, consisting essentially of:

| $B_2O_3$ | 19% |
|----------|-----|
| $Al_2O_3$ | 8% |
| $Na_2O$ | 2% |
| $K_2O$ | 3% |
| BaO | 3% |
| LiF | 1% |
| $SiO_2$ | balance to 100% |

The glass composition does not exclude naturally occurring impurities present in the various oxide ingredients used to make the glass. One such commonly found naturally occurring impurities is iron. Generally, it is desired to minimize the amount of iron in the glass to aid in the transmissivity. According to one embodiment, the glass composition has less than 300 ppm of iron.

The particular glass composition formulated by the inventors allowed the inventors to achieve thermal expansion coefficient for the glass envelope structure 20 that deviates no more than about 4% from the metal sleeve's thermal expansion coefficient in the temperature range from 25° C. to 350° C. In a preferred embodiment, the thermal expansion coefficient of the glass envelope structure 20 having the glass composition disclosed herein is $4.7 \times 10^{-6}$ $K^{-1}$ in the temperature range from 25° C. to 350° C. and, thus, deviates 3.9% from the thermal expansion coefficient of the metal sleeve. Thus, the inventors were able to form a novel improved matched glass-to-metal joint that was previously unattainable in a vacuum tube collector for a solar energy collecting apparatus. The matched glass-to-metal joint disclosed herein consists of a single composition glass part forming the joint as well as the glass envelope cylinder/tube 20 in which the thermal expansion coefficients of the glass part 20 and the metal part 30 are more closely matched than previously achieved.

The end portion 25 of the glass envelope 20 is directly bonded to the cylindrical metal sleeve 30 without material reduction, i.e. without any intervening or intermediary sealing material. The direct glass-to-metal bond of the connecting device or joint 10 can be formed by fusing or melting the end portion 25 of the glass envelope 20 with the metal sleeve 30. The glass-to-metal sealing joint is applicable for use as a sealing joint between the glass tube encasing the metal absorber tube in solar energy vacuum tube collectors.

Figure 2:
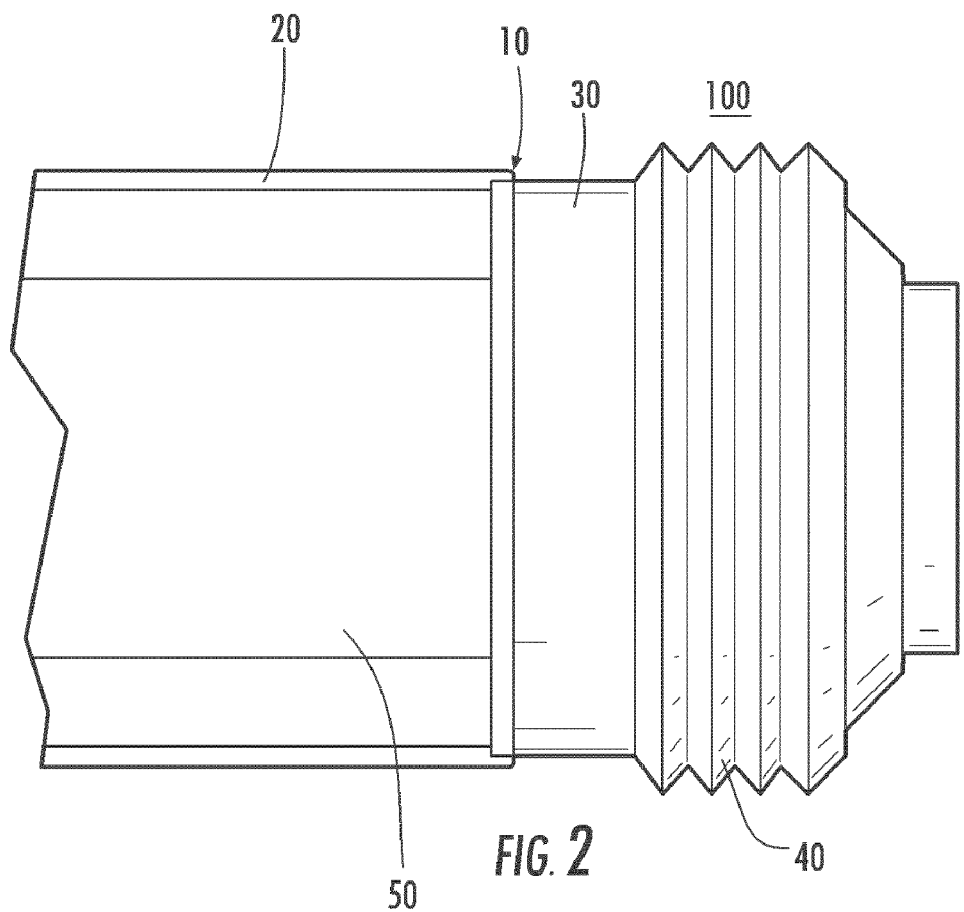
FIG. 2 shows one end of an example of a solar energy vacuum tube collector, also known as heat collector element (HCE), in which the glass-to-metal sealing joint of the present disclosure is incorporated.

FIG. 2 shows one end of an example of a heat collector element (HCE) 100, in which the glass-to-metal sealing joint 10 is incorporated. The HCE 100 is formed of the glass envelope cylinder/tube 20 that is joined to the metal sleeve part 30 via the glass-to-metal sealing joint 10. An absorber tube 50, generally a metal pipe, is provided within the glass envelope 20 and extends through the glass-to-metal sealing joint 10 assembly. A flexible bellows 40 forms a seal between the metal sleeve part 30 and the absorber tube 50. The space 60 between the absorber tube 50 and the glass envelope 20 is in vacuum to provide thermal insulation.

The borosilicate based glass composition disclosed herein is acid and alkali resistant. Furthermore the glass composition disclosed herein can be used to make tubing with a outer diameters of greater than or equal to 115 mm without any problems. This advantageous property makes the use of intermediary glasses in the joint superfluous so that an industrial automated process is possible.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A matched glass-to-metal connecting device for a vacuum tube collector for a solar energy collecting apparatus, the matched glass-to-metal connecting device comprising:
   a glass envelope consisting of a glass having a composition, in percent by weight on the basis of oxide content, consisting essentially of:

| | |
|---|---|
| $B_2O_3$ | 19, |
| $Al_2O_3$ | 8, |
| $Na_2O$ | 2, |
| $K_2O_2$ | 3, |
| BaO | 3, |
| LiF | 1, |
| $SiO_2$ | balance to 100%; and | a metal sleeve directly bonded to the glass envelope, wherein the metal sleeve has a thermal expansion coefficient of $4.89 \times 10^{-6}$ $K^{-1}$ in the temperature range of 25° C. to 350° C. and the glass envelope has a thermal expansion coefficient that deviates from the metal sleeve's thermal expansion coefficient by no more than 4% in the temperature range of 25° C. to 350° C.; and
   an absorber tube positioned within the glass envelope extending through the glass-to-metal joint.

2. The matched glass-to-metal connecting device of claim 1, wherein the thermal expansion 20 coefficient of the glass envelope is $4.7 \times 10^{-6}$ $K^{-1}$.

3. The matched glass-to-metal connecting device of claim 1, wherein the metal sleeve has a wall thickness of from 0.5 mm to 1.5 mm.

4. The matched glass-to-metal connecting device of claim 1, wherein the glass envelope has a wall thickness of 3.0 mm.

5. The matched glass-to-metal connecting device for a vacuum tube collector for a solar energy collecting apparatus of claim 1 further comprising a flexible bellows forming a portion of a seal between the absorber tube and the metal sleeve.

* * * * *